United States Patent [19]
Clanin

[11] Patent Number: 5,827,959
[45] Date of Patent: Oct. 27, 1998

[54] MONITORING CHEMICAL FLOW RATE IN A WATER TREATMENT SYSTEM

[76] Inventor: William B. Clanin, 765 E. Cole Ave., Fresno, Calif. 01890

[21] Appl. No.: 932,844

[22] Filed: Sep. 18, 1997

[51] Int. Cl.[6] .................................................. G01F 15/09
[52] U.S. Cl. ............................ 73/198; 137/893; 137/47.5
[58] Field of Search ................................. 137/893, 47.5; 364/509, 510; 73/198, 199, 195, 196

[56] References Cited

U.S. PATENT DOCUMENTS

| | | | |
|---|---|---|---|
| 3,029,949 | 4/1962 | Whitlock | 137/893 |
| 3,194,254 | 7/1965 | Zmek | 137/893 |
| 3,756,220 | 9/1973 | Tehrani et al. | 137/893 |
| 4,722,360 | 2/1988 | Odajima et al. | 137/487.5 |
| 4,883,086 | 11/1989 | Lejnar | 137/893 |
| 5,050,438 | 9/1991 | Ezell, Jr. | 73/196 |
| 5,230,368 | 7/1993 | Berfield | 137/893 |
| 5,237,865 | 8/1993 | Wada | 73/198 |
| 5,257,538 | 11/1993 | Spendell | 73/198 |
| 5,509,434 | 4/1996 | Boyd et al. | 137/487.5 |

*Primary Examiner*—George M. Dombroske
*Assistant Examiner*—Jewel V. Thompson
*Attorney, Agent, or Firm*—Fish & Richardson P.C.

[57] ABSTRACT

A pressurized chemical tank is connected to a water line through a restriction (e.g., a gas flow control valve). A vacuum-regulating check valve is for maintaining the vacuum pressure of the gas flowing between the tank and the restriction. A gas flow rate sensor is between the restriction and the water line. The sensor is constructed to be responsive to pressure in the gas line, and can be connected to a remote display and/or storage device. The sensor can also provide a feedback signal to a control system for controlling the flow rate.

17 Claims, 4 Drawing Sheets

FIG. 2

MONITORING CHEMICAL FLOW RATE IN A WATER TREATMENT SYSTEM

This invention relates to monitoring chemical flow rates in water treatment systems.

Many municipal water and waste water treatment systems continuously inject treatment chemicals, in gas form, into the water. These chemicals, such as chlorine and sulfur dioxide, are commonly provided in pressurized tanks and are drawn into the flow of water by a flow-induced vacuum. Such systems commonly employ vacuum-regulating safety valves at or near the pressurized chemical tank for regulating the vacuum pressure in the gas delivery line and stopping the flow of gas if the water flow-induced vacuum drops too low.

It is common to locate the hardware associated with chemical treatment near the water line, so as to minimize the associated tubing lengths.

Typically, such systems also include means for adjusting the flow of chemical gas, such as a manual metering valve or other restriction along the gas line. Feedback, either manual or automatic, for such gas flow rate adjustment is sometimes provided by chemical concentration sensors downstream in the water flow. The metering valve sometimes includes a visual feed rate indicator that can provide an instantaneous indication of chemical gas flow at the valve.

It has been discovered that due to the regulation of vacuum pressure upstream of flow control valves in chemical supply lines in certain water treatment systems by appropriate valving upstream of a restriction, chemical supply line pressure below the restriction is indicative of the flow through the restriction. The restriction may be in the form of a typical flow control valve.

It is an important object of the invention to provide an improved flow monitor for water treatment systems.

According to one aspect of the invention, an apparatus for monitoring chemical flow rate in a water treatment system includes a tank, a vacuum-regulating check valve, a conduit constructed to pass the flow of water therethrough, a gas line connecting the check valve and the conduit inlet, and a gas flow rate sensor. The tank contains a water treatment chemical in gas form under pressure. The vacuum-regulating check valve has an inlet and an outlet, the inlet being in fluid communication with the tank. The check valve is constructed to adjust gas flow therethrough to maintain the pressure at the outlet at a predetermined level below atmospheric pressure. The conduit defines a water flow restriction arranged to produce a local vacuum pressure in the conduit in the presence of the flow of water. The conduit further defines an inlet in fluid communication with the check valve at the water flow restriction, for receiving the water treatment chemical for ingestion into the water flow. The gas line includes an upstream portion connected to the check valve, a downstream portion connected to the conduit inlet, and a gas flow restriction disposed between the upstream and downstream portions of the gas line. The flow rate sensor is in pressure communication with the downstream portion of the gas line, and is responsive to pressure to produce an electrical output signal representative of the magnitude of the gas flow rate in the gas line.

In some instances, the chemical is selected from the group of water treatment chemicals consisting of chlorine and sulfur dioxide.

In some embodiments, the gas flow rate sensor includes a housing having a sensing chamber, a vacuum pressure sensor responsive to pressure in the sensing chamber of the housing to produce an electrical output signal representative of the magnitude of the pressure in the sensing chamber, and a flexible diaphragm disposed between the sensing chamber and the gas line and constructed to transfer pressure from the downstream portion of the gas line to the sensing chamber and to resist flow of gas into the sensing chamber.

In some embodiments, the gas flow rate sensor is also in pressure communication with the upstream portion of the gas line, the electrical output signal being indicative of a pressure drop across the gas flow restriction of the gas line. In these embodiments, the gas flow rate sensor housing can have upstream and downstream sensing chambers, with the vacuum pressure sensor arranged between the upstream and downstream sensing chambers and responsive to the difference between the pressures in the upstream and downstream sensing chambers to produce an electrical output signal indicative of this difference. These configurations should have a first flexible diaphragm disposed between the upstream sensing chamber and the upstream portion of the gas line, and a second flexible diaphragm disposed between the downstream sensing chamber and the downstream portion of the gas line. The diaphragms are arranged to transfer pressure from the gas line to the sensing chambers and to resist flow of gas into the sensing chambers.

The gas flow restriction can include, in some cases, a gas flow control valve.

In some cases, the gas flow rate sensor is constructed to produce an electrical output current generally proportional to the gas flow rate in the gas line.

The apparatus also includes, in some applications, a remote flow rate display responsive to the electrical output signal from the gas flow rate sensor. The flow rate display device can be constructed and arranged to alert an operator when the electrical output signal from the gas flow rate sensor is outside a predetermined range, for instance.

In some embodiments, the apparatus also includes a recording device adapted to record the electrical output signal from the gas flow rate sensor over a length of time.

A gas flow restriction controller is also included in some configurations, the restriction controller responsive to the electrical output signal from the gas flow rate sensor for controlling the rate of gas flow.

According to another aspect of the invention, a method of monitoring the flow rate of a chemical in a water treatment system with the above-described apparatus is provided. The method includes sensing the pressure in the downstream portion of the gas line with the gas flow rate sensor, and responding to the sensed pressure with the gas flow rate sensor to provide the electrical output signal representative of the magnitude of the gas flow rate in the gas line.

In some instances, the method includes sensing the difference in pressure between the upstream and downstream portions of the gas line with the gas flow rate sensor, and responding to the sensed pressure difference with the gas flow rate sensor to provide the electrical output signal representative of the magnitude of the gas flow rate in the gas line.

The method includes, in some embodiments, various combinations of the following actions: transmitting the electrical output signal to a remote display; triggering an alarm to alert an operator when the output signal is outside a predetermined range; and recording a time history of the electrical output signal.

In some applications, the method includes controlling the gas flow rate by responding to the electrical output signal and adjusting the gas flow restriction accordingly.

This new and useful improvement in water treatment systems can enable the remote monitoring of chemical gas flow in a water treatment system, such as from a central control room. Readily installed in many existing treatment systems, this invention can provide a simple, low-cost alternative to more complicated flow measurement systems. Coupled with electronic flow control valving, the invention can also provide automated flow control with direct chemical flow rate feedback. The invention can enable the substantially real-time monitoring of chemical usage rates in such systems.

Other features, objects and advantages of the invention will become apparent from the following detailed description read in connection with the accompanying drawings in which FIG. 1 shows a pictorial representation of a water treatment system incorporating the invention;

Figure 1:
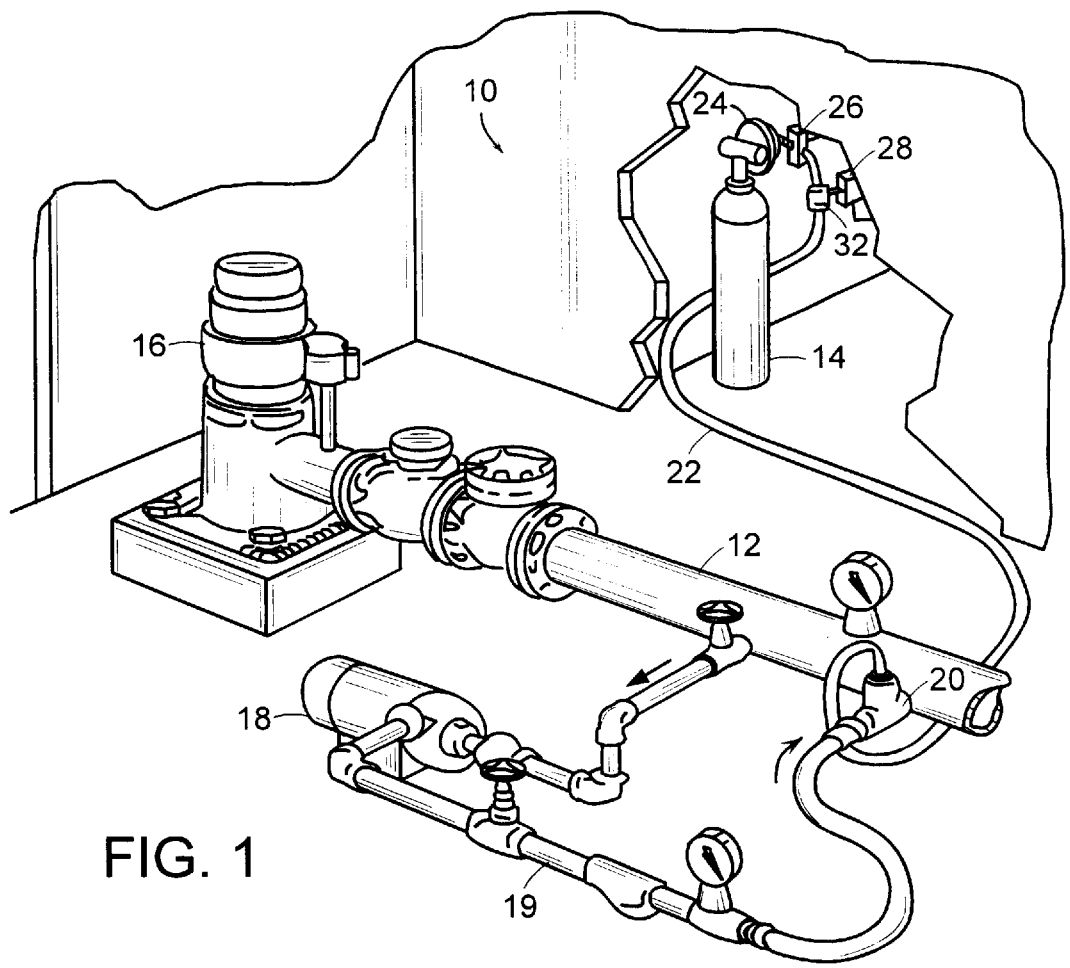

Referring first to FIG. 1, a water treatment system 10 meters a water treatment chemical, such as chlorine or sulfur dioxide, into a water supply line 12 from a pressurized tank 14. Corresponding elements are identified by corresponding reference symbols throughout the drawings. Water line 12 contains a flow of water motivated by a pump 16. A booster pump 18 increases the pressure in a treatment bypass line 19 to a pressure higher that the main water line pressure, forcing a bypass water flow back into the main water line 12 through a chemical ejector 20 which adds the water treatment chemical to the bypass water flow. The bypass water flow through ejector 20 creates a vacuum pressure in the chemical line 22, drawing the treatment chemical from tank 14 through a vacuum-regulating valve 24 and a manual flow control valve 26. The configuration of the main and bypass water lines and water pumps heretofore described is well known. Ejectors 20 and valves 24 and 26, as shown, are currently available from Chemical Injection Technologies, Inc. of Ft. Pierce, Fla.

According to the invention, the water treatment system of FIG. 1 also includes an electronic flow monitor 28 for monitoring the flow of water treatment chemical in line 22. Monitor 28 provides an electronic signal via wires 30 for remote display and storage of flow information. As will be more fully described below, monitor 28 is constructed to be responsive to the vacuum pressure in line 22, and is connected to the chemical line at a hydraulic "T" connection 32 between flow control valve 26 and ejector 20.

Figure 2:
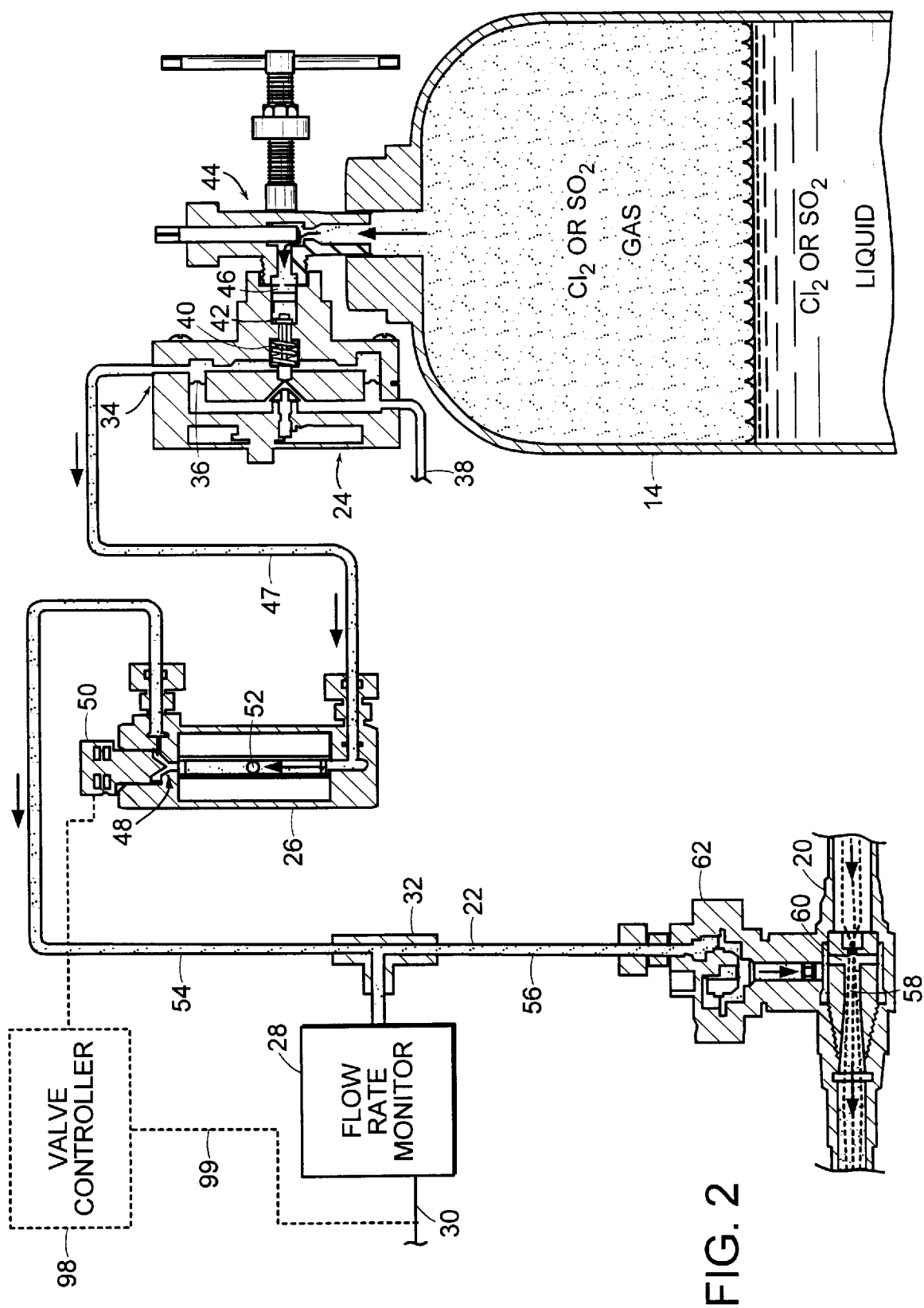
FIG. 2 is a diagram schematically illustrating the flow of chemical gas through the water treatment system of FIG. 1.

With reference to FIG. 2, vacuum regulating valve 24 also functions as a safety valve by inhibiting the flow of chemical gas until a sufficient vacuum is applied at the outlet 34 of the valve. Valve 24 contains a spring-loaded diaphragm 36 that is exposed to atmospheric pressure on one side through a vent line 38 and to the chemical gas on the other side. As the pressure in the chemical gas at the outlet of the regulating valve drops a predetermined amount below atmospheric pressure, diaphragm 36 moves against spring 40 and the pressure in tank 14 to open an inlet valve 42 at the inlet 44 of the regulating valve. Once open, the regulating valve continuously adjusts inlet valve 42, through the operation of diaphragm 36, to work to maintain a predetermined vacuum pressure at valve outlet 34. If the pressure at outlet 34 rises beyond the ability of the diaphragm to adjust to regulate it, which might indicate that the gas flow has stopped for any number of reasons, spring 40 urges the valve closed. A filter 46 at inlet 44 helps to remove gas-borne contaminants that might harm the valves.

Thus, over a useful range of flow rates, regulating valve 24 maintains a constant vacuum pressure in line 47 between regulating valve 24 and flow control valve 26. Important to the operation of the invention, valve 26 includes an adjustable, flow-controlling restriction 48. In the embodiment shown, this restriction is manually adjustable by turning a knob 50. In another embodiment, valve 26 is electronically adjustable through the incorporation of an appropriate solenoid or motor or other means known in the art. Valve 26 also includes a visible feed rate indicator 52 in the form of a ball in a tapered, translucent portion of the flow line.

Vacuum tubing 54 connects the outlet of valve 26 to "T" coupling 32 at which flow monitor 28 is attached. Another length 56 of tubing carries the chemical gas flow to ejector 20 at the bypass water line.

Ejector 20 has a venturi-type fixed orifice restriction 58 through which the bypass water flow passes, creating a vacuum pressure at the chemical inlet 60, which pressure draws the chemical gas through the system. Ejector 20 also contains a one-way check valve 62 that prohibits flow of water up line 22 when the water flow is stopped.

Flow monitor 28 senses the vacuum pressure in line 22 through "T" coupling 32, and transmits an electronic signal via line 30 to a remote display or storage device for monitoring flow information. Because of the constancy of the pressure in line 46 established by regulating valve 24, fluctuations in the pressure in line 22 are attributable to pressure drops between line 46 and coupling 32, which are primarily flow-dependent. In particular, restriction 48 causes a reasonably predictable linear pressure drop as a function of gas flow over a typical range of operating temperatures.

Figure 3:
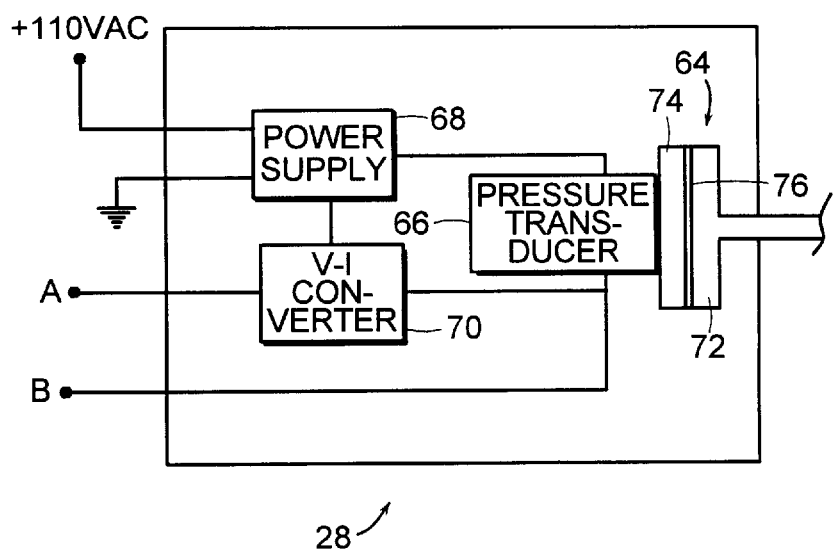
FIG. 3 is a block diagram illustrating the logical arrangement of the electronic flow monitor.

Referring to FIG. 3, flow monitor 28 includes a gas barrier 64, a pressure transducer 66, a power supply 68 and a voltage/current converter 70. Gas barrier 64 has an inlet cavity 72 in hydraulic communication with the chemical gas flow in line 22 of FIG. 2 and a sealed cavity 74 in hydraulic communication with the pressure sensing means of pressure transducer 66. A flexible diaphragm 76 blocks the flow of chemical gas from inlet cavity 72 to sealed cavity 74 without substantially hindering the transfer of pressure between the two cavities. Diaphragm 76 is made of a material compatible with the chemical gas used in the water treatment system. For use with chlorine and sulfur dioxide gas, ethylene-chlorotrifluoroethylene (e.g., "HALAR" sold by Westlake Plastics in Lenni, Pa.) works satisfactorily. "VITON" may also be used.

Figure 3A:
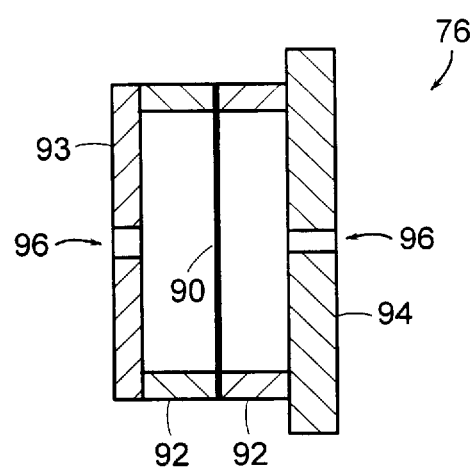
FIG. 3A is a cross-sectional view through the flexible diaphragm of the flow monitor.

A recommended construction of diaphragm 76 is shown in FIG. 3A. A 0.003 inch thick, circular film 90 of "HALAR" is bonded about its edge to one circular ring 92 such that it is not stretched but in a relaxed state. Another ring 92, along with a disk 93 and a base 94, are bonded to the assembly as shown, such that film 90 is free to flex axially within the cavity formed by rings 92 to transmit pressures. Both disk 93 and base 94 have through holes 96 for communicating pressures to each side of the film. Rings 92, disk 93 and base 94 can be fabricated from PVC, and can be etched for proper bonding. For bonding the "HALAR" film to the PVC, I have used "SCOTCH WELD" 2216, available from 3M.

A suitable pressure transducer 66 has a full scale output of 4.5 VDC at a pressure of 100 kPa for good sensitivity. The VDC output of the transducer may be provided as an output signal B of monitor 28 for transmission to a remote location. A currently suitable pressure transducer 66 is the MPX model available from Motorola Semiconductor Products in Phoenix, Ariz. If a differential pressure transducer is used, one of the inputs to the transducer should be sealed and the other connected to chamber 74.

Power supply 68 accepts an electrical power input, typically in the form of 110 VAC line power, and provides electrical power in the necessary form to support pressure transducer 66 and voltage-current converter 70. The power supply is not necessary if the other electrical components of the monitor are constructed to be powered directly from available power inputs.

Converter 70 is an optional component of the monitor, providing signal output A in the form of an electrical current proportional to the voltage output of the pressure transducer. A suitable converter 70 has an output in the 4 to 20 mA range. The calibration of output A can be adjusted by adjusting converter 70. Simple circuitry may also be added for field-calibrating output B if desired.

Figure 4:
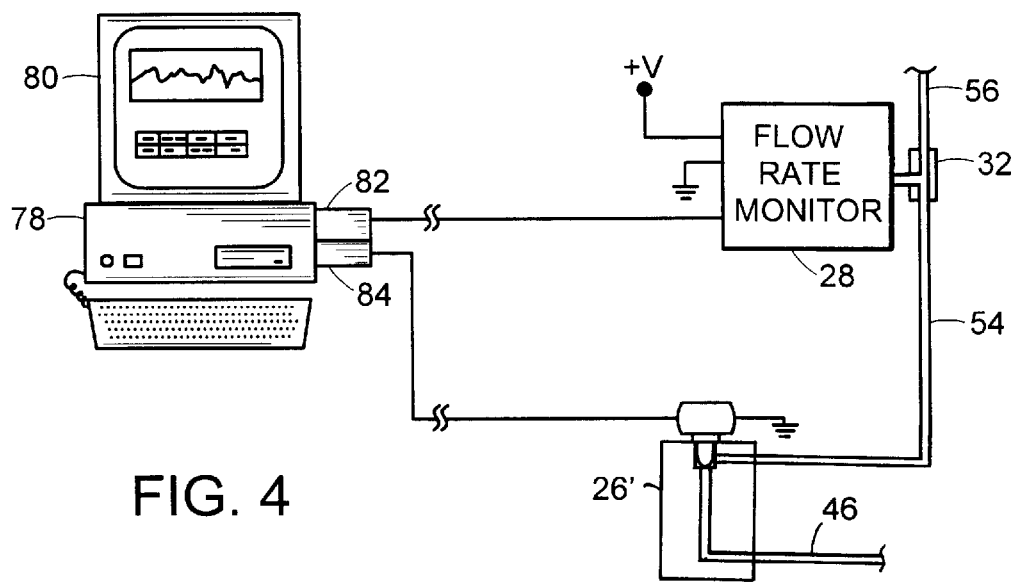
FIG. 4 is a diagram schematically illustrating the interconnection of components of the water treatment system incorporating the invention.

Referring to FIG. 4, the flow rate monitor 28 can be readily connected, via line 30, to a computer 78 with a display monitor 80 for storing and/or viewing flow rate information at a remote location. Computer 78 includes an A/D data acquisition card 82 for receiving and conditioning either current signal A or voltage signal B from flow rate monitor 28. Besides being programmed to display and store flow rate information, the computer is preferably also adapted to monitor the rate of change of flow rate over time (i.e., to differentiate the flow rate) and alert the operator, either visually or audibly, if the rate of change of flow rate, and/or the flow rate itself, fall outside predetermined ranges. Such alert-worthy conditions may indicate incipient problems in the water treatment or supply systems, such as clogged filters or failing pumps.

Additionally, a D/A control card 84 can be included with computer 78 for controlling an electronic flow control valve 26'. This embodiment can provide substantially real-time control of chemical flow rate with direct flow rate feedback instead of feedback from treatment chemical concentration sensors located farther downstream in the water line.

Referring back to FIG. 2, another feedback option for controlling flow rate based on information from flow rate monitor 28 is represented by optional valve controller 98 and feedback line 99. The electrical output of the flow rate monitor is directly input to controller 98 in order to maintain the gas flow rate within a range about a desired value. Thus, the flow rate is controlled with a direct feedback of flow rate (based on line pressure), rather than by downstream chemical concentrations. Flow rate monitor 28 may supply this feedback information as a separate output apart from line 30, such as a digital line.

Figure 5:
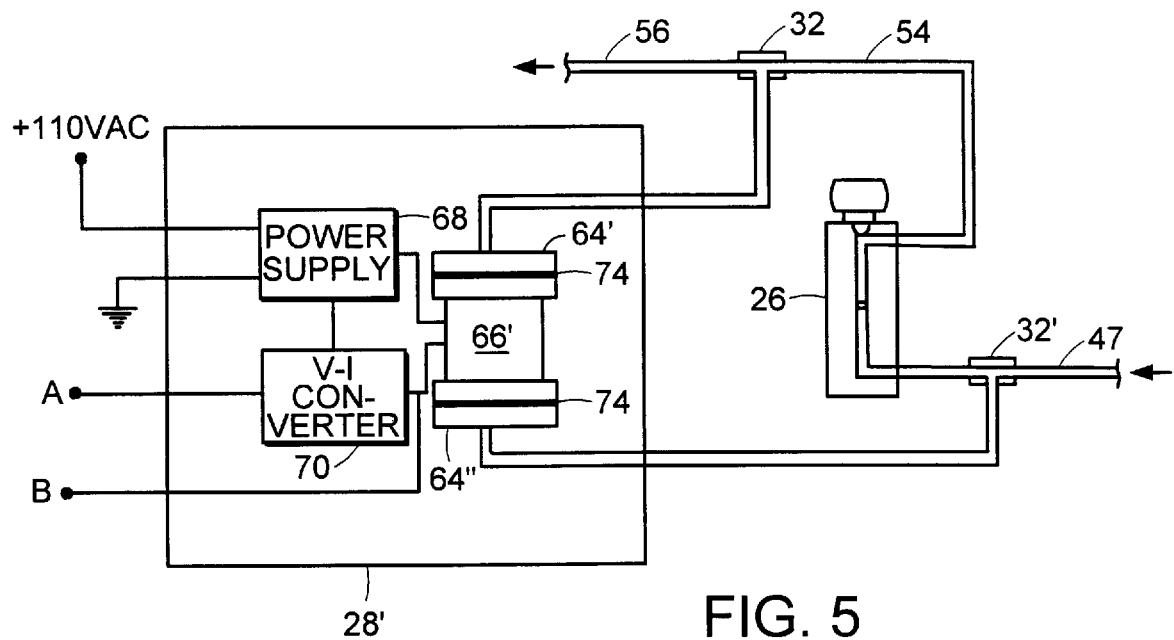
FIG. 5 is a diagram illustrating an alternate configuration of the electronic flow monitor according to the invention in a water treatment system.

FIG. 5 illustrates a second embodiment of the flow rate monitor, designated as 28', for use in water treatment systems in which gas line 46 from the chemical tank to flow control valve 26 is not sufficiently pressure-regulated to permit sufficiently accurate flow measurement with the embodiment of FIG. 3. The primary difference between the two embodiments is that flow rate monitor 28' of FIG. 5 is constructed to measure the pressure difference between two pressure inputs, one from each side of flow control valve 26. The MPX sensor referred to above is available as a differential pressure sensor 66' and works for this purpose. The inputs to pressure transducer 66' are coupled to two separate gas barriers 64' and 64" for receiving pressure from gas line 22 through couplings 32 and 32' respectively on opposite sides of flow control valve 26.

By measuring the pressure differential across flow control valve 26, the output of flow rate monitor 28' is not substantially affected by low frequency fluctuations in the static pressure in line 47. Thus, monitor 28' can be employed to provide more accurate flow rate information during periods of imperfect vacuum regulation.

Other embodiments and advantages are also within the scope of the following claims.

What is claimed is:

1. Apparatus for monitoring chemical flow rate in a water treatment system comprising, a tank containing a water treatment chemical in gas form under pressure;

a vacuum-regulating check valve with an inlet and an outlet, the inlet being in fluid communication with the tank, the check valve constructed to adjust gas flow therethrough to maintain the pressure at the outlet at a predetermined level below atmospheric pressure;

a conduit constructed to pass the flow of water therethrough, the conduit defining a water flow restriction arranged to produce a local vacuum pressure in the conduit in the presence of said flow, the conduit further defining an inlet, in fluid communication with the check valve, at the water flow restriction for receiving the water treatment chemical for ingestion into the water flow;

a gas line connecting the check valve and the conduit inlet, the gas line comprising
      an upstream portion connected to the check valve,
      a downstream portion connected to the conduit inlet, and
      gas flow restriction disposed between the upstream and downstream portions; and a gas flow rate sensor in pressure communication with the downstream portion of the gas line, the sensor responsive to pressure to produce an electrical output signal representative of the magnitude of the gas flow rate in the gas line.

2. The apparatus of claim 1 wherein the chemical is selected from the group of water treatment chemicals consisting of chlorine and sulfur dioxide.

3. The apparatus of claim 1 wherein the gas flow rate sensor comprises, a housing having a sensing chamber;

a vacuum pressure sensor responsive to pressure in the sensing chamber of the housing to produce an electrical output signal representative of the magnitude of the pressure in the sensing chamber; and a flexible diaphragm disposed between the sensing chamber and the gas line and constructed to transfer pressure from the downstream portion of the gas line to the sensing chamber and to resist flow of gas into the sensing chamber.

4. The apparatus of claim 1 wherein the gas flow rate sensor is also in pressure communication with the upstream portion of the gas line, said electrical output signal being indicative of a pressure drop across the gas flow restriction of the gas line.

5. The apparatus of claim 4 wherein the gas flow rate sensor comprises a housing having upstream and downstream sensing chambers;

a vacuum pressure sensor arranged between the upstream and downstream sensing chambers responsive to the difference between the pressures in the upstream and downstream sensing chambers to produce an electrical output signal indicative of said difference;

a first flexible diaphragm disposed between the upstream sensing chamber and the upstream portion of the gas line; and a second flexible diaphragm disposed between the downstream sensing chamber and the downstream portion of the gas line, the diaphragms arranged to transfer pressure from the gas line to the sensing chambers and to resist flow of gas into the sensing chambers.

6. The apparatus of claim 1 wherein the gas flow restriction comprises a gas flow control valve.

7. The apparatus of claim 1 wherein the gas flow rate sensor is constructed to produce an electrical output current generally proportional to the gas flow rate in the gas line.

8. The apparatus of claim 1 and further comprising a remote flow rate display responsive to the electrical output signal from the gas flow rate sensor.

9. The apparatus of claim 8 wherein the flow rate display device is constructed and arranged to alert an operator when the electrical output signal from the gas flow rate sensor is outside a predetermined range.

10. The apparatus of claim 1 and further comprising a recording device adapted to record the electrical output signal from the gas flow rate sensor over a length of time.

11. The apparatus of claim 1 and further comprising a gas flow restriction controller, the restriction controller responsive to said electrical output signal from said gas flow rate sensor for controlling the rate of gas flow.

12. A method of monitoring the flow rate of a chemical in a water treatment system with the apparatus of claim 1, comprising sensing the pressure in the downstream portion of the gas line with said gas flow rate sensor, and responding to the sensed pressure with said gas flow rate sensor to provide said electrical output signal representative of the magnitude of the gas flow rate in the gas line.

13. A method of monitoring the flow rate of a chemical in a water treatment system with the apparatus of claim 4 comprising, sensing the difference in pressure between the upstream and downstream portions of the gas line with said gas flow rate sensor, and responding to the sensed pressure difference with said gas flow rate sensor to provide said electrical output signal representative of the magnitude of the gas flow rate in the gas line.

14. The method of claim 12 and further comprising transmitting said electrical output signal to a remote display.

15. The method of claim 12 and further comprising triggering an alarm to alert an operator when the output signal is outside a predetermined range.

16. The method of claim 12 and further comprising recording a time history of the electrical output signal.

17. The method of claim 12 and further comprising controlling the gas flow rate by responding to said electrical output signal and adjusting the gas flow restriction accordingly.

* * * * *